UNITED STATES PATENT OFFICE.

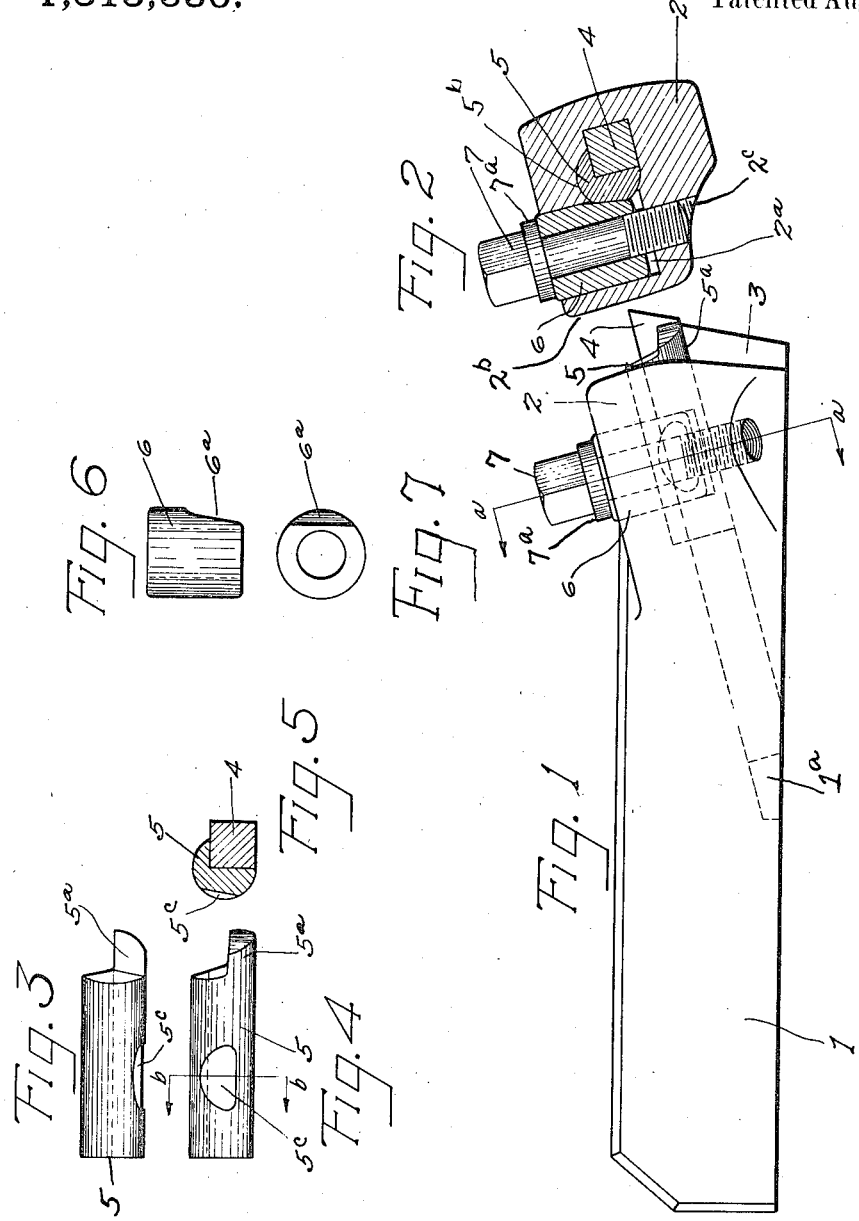

ROBERT J. SAUM, OF SPRINGFIELD, OHIO, ASSIGNOR TO THE WESTERN TOOL & MANUFACTURING COMPANY, OF SPRINGFIELD, OHIO, A CORPORATION OF OHIO.

TOOL-HOLDER.

1,313,336.   Specification of Letters Patent.   Patented Aug. 19, 1919.

Application filed January 30, 1919. Serial No. 273,956.

*To all whom it may concern:*

Be it known that I, ROBERT J. SAUM, a citizen of the United States, residing at Springfield, in the county of Clark and State of Ohio, have invented certain new and useful Improvements in Tool-Holders, of which the following is a specification.

This invention relates to improvements in tool holders for lathes.

The object of the invention is to provide a holder which will be especially adaptable for holding a tool of brittle character such as stellite although the constructions are equally applicable to tools of other material.

A further object of the invention is to provide a tool which will be simple in construction, economical in manufacture and effective in use.

In the accompanying drawing,

Figure 1 is a side elevation of a tool holder embodying my improvements.

Fig. 2 is a section on the line *a—a* of Fig. 1.

Fig. 3 is a top plan of the clamp member which engages the tool.

Fig. 4 is a side elevation of the same.

Fig. 5 is a transverse section of the tool clamp and tool, the section being on the line *b—b* of Fig. 4.

Fig. 6 is a side view of the wedge which engages the clamp.

Fig. 7 is an end view of the same.

In the said drawings, 1 represents the shank of the holder and 2 the head thereof, the head being laterally off-set as indicated at $2^b$ and having a forwardly extending support 3. The off-set portion is formed with a bore $2^a$ extending in a substantially vertical direction, with the lower end of the bore reduced and screwthreaded as indicated at $2^c$. The head and shank are provided with the usual tool receiving channel $1^a$, inclined upwardly. This tool receiving channel is square in cross-section and intersects or communicates with a round bore $5^b$ formed in the head, this round bore $5^b$ in turn intersecting or communicating with the bore $2^a$. The channel $1^a$ receives the tool 4 and inserted in the bore $5^b$ is a clamp 5. This clamp 5 is formed with a straight-sided groove to conform to the shape of the tool, which is square in cross-section, one portion of the clamp 5 lying along the top of the tool while the other portion thereof extends along the side thereof. The forward end of the side of the clamp has a reduced extension $5^a$ which extends to the extreme forward end of the tool 4, as indicated in Fig. 1 and coacts with the extension 3 to support and brace the tool at that point; it being understood that owing to the necessity of clearance it is impracticable to have the clamp project beyond the end of the head of the holder, and also for the sake of clearance the extension $5^a$ lies against only the lower half of the side of the tool.

Located in the bore $2^a$ is a wedge in the nature of a sleeve 6 and extending through this wedge and threaded into the reduced portion of the bore $2^c$ is a screw 7 having a collar $7^a$ to engage the upper end of the wedge. The wedge 6 has a beveled face $6^a$ to engage the clamp 5, which, when in position, will lie partly within the bore $2^a$, and the clamp 5 is provided with a recess $5^c$ at that point where it is engaged by the wedge so as to obviate any tendency of the clamp to travel in a longitudinal direction. By using a wrench or other tool upon the square head of the screw the wedge can be firmly tightened against the clamp 5 so as to force the clamp into tight engagement with the tool 4.

By the construction described, a holder is provided which is effective for a tool formed of stellite, which is of a hard but very brittle character and which such clamping means as a set screw has a tendency to crush. In the present holder the clamp is of such a nature that the tool will be clamped and held for practically its entire length on all sides thereof so that any tendency to crush is obviated.

Having thus described my invention, I claim:—

1. In a tool holder, a support having a tool receiving channel, together with a tool therein, a clamp located in said support and fitted to the top and one side of said tool, a bore in said support arranged at right-angles to said channel, a wedge in said bore, and means for tightening said wedge against said clamp.

2. In a tool holder, a support having a tool receiving channel, together with a tool therein, a removable clamping member in said support extending along the top and one side of said tool, said support having a bore arranged at right-angles to the longitudinal axis of said clamp with the clamp extending partly within the same, a wedge in said bore, and means for tightening said wedge against that part of the clamp located within the bore.

3. In a tool holder, a support having a tool receiving channel, together with a tool therein, a clamp located in said support and extending along the top and one side of said tool, said support having a bore, a wedge located in said bore having an inclined surface, a portion of said clamp extending into said bore and having a recess to receive the inclined surface of said wedge, and means for forcing and holding the beveled portion of said wedge into engagement with the recessed portion of said clamp.

4. In a tool holder, a support having a tool receiving channel, together with a tool therein, a clamping member in said support arranged along the top and one side of said tool, a projection on the forward end of the said clamp extending to substantially the extreme forward end of said tool on the lower side portion thereof only, a forward projection on said support to form a support for the under side of said tool at its extreme forward end, and means for forcing said clamp into tightened engagement with said tool.

In testimony whereof, I have hereunto set my hand this 25th day of January, 1919.

ROBERT J. SAUM.

Witness:
   CHAS. I. WELCH.